US009985846B1

(12) United States Patent
Roman et al.

(10) Patent No.: US 9,985,846 B1
(45) Date of Patent: May 29, 2018

(54) ASSISTANT FOR MANAGEMENT OF NETWORK DEVICES

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/622,740

(22) Filed: Jun. 14, 2017

Related U.S. Application Data

(63) Continuation-in-part of application No. 15/587,253, filed on May 4, 2017, and a continuation-in-part of application No. 15/587,263, filed on May 4, 2017.

(60) Provisional application No. 62/446,498, filed on Jan. 15, 2017, provisional application No. 62/486,400, filed on Apr. 17, 2017, provisional application No. 62/486,404, filed on Apr. 17, 2017.

(51) Int. Cl.
*G06F 15/173* (2006.01)
*H04L 12/24* (2006.01)
*H04L 29/08* (2006.01)

(52) U.S. Cl.
CPC .......... *H04L 41/24* (2013.01); *H04L 41/0806* (2013.01); *H04L 41/0813* (2013.01); *H04L 41/0879* (2013.01); *H04L 41/22* (2013.01); *H04L 41/50* (2013.01); *H04L 67/34* (2013.01)

(58) Field of Classification Search
USPC ....... 709/203, 206, 217, 219, 223, 224, 226, 709/228; 714/25; 455/426.1, 552.1; 370/328, 389
See application file for complete search history.

(56) References Cited

U.S. PATENT DOCUMENTS

| 6,795,688 | B1 | 9/2004 | Plasson et al. |
| 7,826,408 | B1 | 11/2010 | Vleugels et al. |
| 8,156,388 | B2* | 4/2012 | Herrod ............... G06F 11/0742 714/25 |
| 8,838,095 | B2* | 9/2014 | Jouin .................... G06F 3/1438 455/426.1 |
| 8,903,377 | B2* | 12/2014 | Jouin .................... G06F 3/1438 370/328 |
| 9,462,566 | B1 | 10/2016 | Koller et al. |
| 2002/0174209 | A1 | 11/2002 | Sesek et al. |
| 2003/0041159 | A1 | 2/2003 | Tinsley et al. |
| 2005/0182852 | A1 | 8/2005 | Tinsley et al. |

(Continued)

OTHER PUBLICATIONS

International Search Report and Written Opinion dated Aug. 24, 2017 in International Application No. PCT/US17/35550, 10 pages.

(Continued)

*Primary Examiner* — Quang N Nguyen
(74) *Attorney, Agent, or Firm* — Perkins Coie LLP

(57) ABSTRACT

Management of devices on a wireless network is described. An assistant device can determine how a user used resources and/or devices outside of an environment. Based on how the user used those resources and/or devices, configuration settings of local devices within the environment can be updated to provide new resources or settings.

13 Claims, 8 Drawing Sheets

(56) References Cited

U.S. PATENT DOCUMENTS

| | | |
|---|---|---|
| 2005/0190755 A1* | 9/2005 | Singh ................ H04L 67/322 |
| | | 370/389 |
| 2006/0215601 A1 | 9/2006 | Vleugels et al. |
| 2008/0205339 A1 | 8/2008 | Brophy et al. |
| 2008/0280588 A1 | 11/2008 | Roundtree et al. |
| 2009/0319765 A1 | 12/2009 | Fehrle |
| 2011/0292920 A1 | 12/2011 | Krieter |
| 2012/0071152 A1 | 3/2012 | Roundtree et al. |
| 2012/0157209 A1 | 6/2012 | Yamashita et al. |
| 2013/0078994 A1* | 3/2013 | Jouin ................... G06F 3/1438 |
| | | 455/552.1 |
| 2013/0081113 A1 | 3/2013 | Cherian et al. |
| 2013/0244784 A1 | 9/2013 | Assa et al. |
| 2013/0318343 A1 | 11/2013 | Bjarnason et al. |
| 2014/0050319 A1 | 2/2014 | Pang et al. |
| 2014/0122862 A1 | 5/2014 | Ludwig et al. |
| 2014/0187200 A1 | 7/2014 | Reitter et al. |
| 2014/0248864 A1 | 9/2014 | Rangarajan et al. |
| 2015/0058952 A1 | 2/2015 | Os et al. |
| 2016/0150576 A1 | 5/2016 | Moisio et al. |
| 2017/0249574 A1* | 8/2017 | Knijnik ............ G06Q 10/06313 |

OTHER PUBLICATIONS

International Search Report and Written Opinion dated Oct. 20, 2017 in International Application No. PCT/US2017/035549, 16 pages.

Non-Final Office Action dated Sep. 14, 2017 for U.S. Appl. No. 15/587,263, of Roman, M., filed May 4, 2017.

Notice of Allowance dated Sep. 22, 2017 for U.S. Appl. No. 15/587,253, of Roman, M., filed May 4, 2017.

U.S. Appl. No. 15/587,253 of Roman, M., filed May 4, 2017.

U.S. Appl. No. 15/587,263 of Roman, M., filed May 4, 2017.

\* cited by examiner

ASSISTANT FOR MANAGEMENT OF NETWORK DEVICES

CLAIM FOR PRIORITY

This application is a continuation-in-part of U.S. patent application Ser. No. 15/587,253, entitled "Assistant for Management of Network Devices," by Roman et al., and filed on May 4, 2017, and this application is also a continuation-in-part of U.S. patent application Ser. No. 15/587,263, entitled "Management of Network Devices Based on Characteristics," by Roman et al., and filed on May 4, 2017. U.S. patent application Ser. No. 15/587,253 claims priority to U.S. Provisional Patent Application No. 62/446,498, entitled "Assistant for Management of Network Devices," by Roman et al., and filed on Jan. 15, 2017; U.S. Provisional Patent Application No. 62/486,400, entitled "Assistant for Management of Network Devices," by Roman, and filed on Apr. 17, 2017; and U.S. Provisional Patent Application No. 62/486,404, entitled "Management of Network Devices Based on Characteristics," by Roman, and filed on Apr. 17, 2017. U.S. patent application Ser. No. 15/587,263 claims priority to U.S. Provisional Patent Application No. 62/446,498, entitled "Assistant for Management of Network Devices," by Roman et al., and filed on Jan. 15, 2017; U.S. Provisional Patent Application No. 62/486,404, entitled "Assistant for Management of Network Devices Based on Characteristics," by Roman, and filed on Apr. 17, 2017; and U.S. Provisional Patent Application No. 62/486,400, entitled "Assistant for Management of Network Devices," by Roman, and filed on Apr. 17, 2017. The content of the above-identified applications are incorporated herein by reference in their entirety.

TECHNICAL FIELD

This disclosure relates to wireless networks, and in particular an assistant device and techniques for installing and managing network devices on a wireless network.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. However, as more devices include network connectivity, the demands on wireless networks can increase as the amount of data exchanged among the devices increases. In the smart home environment, this can also lead to an increase in the number of devices that need to connect to the home's wireless network. Setting up a vast number of devices on the wireless network can be a difficult and laborious process. Additionally, devices can often lose their configuration settings and, therefore, need to be set up again to connect to the home's wireless network.

SUMMARY

Some of the subject matter described herein also includes a method including receiving usage information representing how a user interacted with devices outside of an environment. It can be determined that the usage information indicates that the user selected a resource provided by a first device at a first location outside of the environment and that a local device within the environment is currently not providing the resource. The method can also include updating configuration settings of the local device within the environment to provide the resource that the first device provided at the first location outside of the environment.

In some implementations, the method includes updating configuration settings of a mobile device to prioritize selection of the resource provided by the local resource over another resource within the environment.

In some implementations, the method includes determining that the usage information also represents characteristics of a mobile device used by the user corresponding to the selection of the resource provided by the first device at the first location outside of the environment. Updating the configuration settings of the local device within the environment is based on the characteristics of the mobile device corresponding to the selection of the resource provided by the first device at the first location outside of the environment.

In some implementations, the resource provided by the first device is a wireless network, and the characteristics of the mobile device include one or more of a battery life remaining of the mobile device or a signal strength of the wireless network from a perspective of the mobile device.

In some implementations, the usage information also indicates that the user selected a resource provided by a second device at a second location outside of the environment, the first location being different than the second location. The method can further include determining that the user prefers the resource provided by the first device rather than the resource provided by the second device, wherein updating the configuration settings of the local device within the environment to provide the resource that the first device provided at the first location outside of the environment is based on the determination that the user prefers the resource provided by the first device rather than the resource provided by the second device.

In some implementations, the usage information further indicates characteristics of the first location. Updating configuration settings of the local device within the environment to provide the resource that the first device provided at the first location outside of the environment is based on the characteristics of the first location.

In some implementations, the usage information indicates that the user selected a resource provided by a second device at a second location outside of the environment, wherein the usage information further indicates characteristics of the second location. Updating the configuration settings of the local device within the environment to provide the resource that the first device provided rather than the resource provided by the second device is based on the characteristics of the first location and the second location.

In some implementations, the local device within the environment is an assistant device configured to respond to the user in audio output including speech, and the resource is a graphical user interface (GUI) provided by the assistant device on a display screen.

Some of the subject matter described herein also includes an electronic device including one or more processors; and memory storing instructions, wherein the processor is configured to execute the instructions such that the processor and memory are configured to receive usage information representing how a user interacted with devices outside of an environment. The electronic device can also determine that the usage information indicates that the user selected a resource provided by a first device at a first location outside of the environment and that a local device within the environment is currently not providing the resource. Configuration settings of the local device within the environment can be updated to provide the resource that the first device provided at the first location outside of the environment.

In some implementations, the processor is configured to execute the instructions such that the processor and memory are configured to update configuration settings of a mobile device to prioritize selection of the resource provided by the local resource over another resource within the environment.

In some implementations, the processor is configured to execute the instructions such that the processor and memory are configured to determine that the usage information also represents characteristics of a mobile device used by the user corresponding to the selection of the resource provided by the first device at the first location outside of the environment. Updating the configuration settings of the local device within the environment is based on the characteristics of the mobile device corresponding to the selection of the resource provided by the first device at the first location outside of the environment.

In some implementations, the resource provided by the first device is a wireless network, and the characteristics of the mobile device include one or more of a battery life remaining of the mobile device or a signal strength of the wireless network from a perspective of the mobile device.

In some implementations, the usage information also indicates that the user selected a resource provided by a second device at a second location outside of the environment, the first location being different than the second location, wherein the processor is configured to execute the instructions such that the processor and memory are configured to: determine that the user prefers the resource provided by the first device rather than the resource provided by the second device. Updating the configuration settings of the local device within the environment to provide the resource that the first device provided at the first location outside of the environment is based on the determination that the user prefers the resource provided by the first device rather than the resource provided by the second device.

In some implementations, the usage information further indicates characteristics of the first location. Updating configuration settings of the local device within the environment to provide the resource that the first device provided at the first location outside of the environment is based on the characteristics of the first location.

In some implementations, the usage information indicates that the user selected a resource provided by a second device at a second location outside of the environment, wherein the usage information further indicates characteristics of the second location. Updating the configuration settings of the local device within the environment to provide the resource that the first device provided rather than the resource provided by the second device is based on the characteristics of the first location and the second location.

In some implementations, the local device within the environment is an assistant device configured to respond to the user in audio output including speech, and the resource is a graphical user interface (GUI) provided by the assistant device on a display screen.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: receive usage information representing how a user interacted with devices outside of an environment. It can be determined that the usage information indicates that the user selected a resource provided by a first device at a first location outside of the environment and that a local device within the environment is currently not providing the resource. Configuration settings of the local device within the environment can be updated to provide the resource that the first device provided at the first location outside of the environment.

In some implementations, the computer program instructions cause the one or more computing devices to: update configuration settings of a mobile device to prioritize selection of the resource provided by the local resource over another resource within the environment.

In some implementations, the computer program instructions cause the one or more computing devices to: determine that the usage information also represents characteristics of a mobile device used by the user corresponding to the selection of the resource provided by the first device at the first location outside of the environment, wherein updating the configuration settings of the local device within the environment is based on the characteristics of the mobile device corresponding to the selection of the resource provided by the first device at the first location outside of the environment.

In some implementations, the resource provided by the first device is a wireless network, and the characteristics of the mobile device include one or more of a battery life remaining of the mobile device or a signal strength of the wireless network from a perspective of the mobile device.

In some implementations, the usage information also indicates that the user selected a resource provided by a second device at a second location outside of the environment, the first location being different than the second location. The computer program instructions cause the one or more computing devices to: determine that the user prefers the resource provided by the first device rather than the resource provided by the second device, wherein updating the configuration settings of the local device within the environment to provide the resource that the first device provided at the first location outside of the environment is based on the determination that the user prefers the resource provided by the first device rather than the resource provided by the second device.

In some implementations, the usage information further indicates characteristics of the first location. Updating configuration settings of the local device within the environment to provide the resource that the first device provided at the first location outside of the environment is based on the characteristics of the first location.

In some implementations, the usage information indicates that the user selected a resource provided by a second device at a second location outside of the environment, wherein the usage information further indicates characteristics of the second location. Updating the configuration settings of the local device within the environment to provide the resource that the first device provided rather than the resource provided by the second device is based on the characteristics of the first location and the second location.

In some implementations, the local device within the environment is an assistant device configured to respond to the user in audio output including speech, and the resource is a graphical user interface (GUI) provided by the assistant device on a display screen.

Some of the subject matter described herein includes a method for a home assistant device having artificial intelligence (AI) capabilities to update configuration settings of devices within an environment of the home assistant device based on usage of devices outside of the environment, including receiving, by a processor, usage information from a smartphone that represents how a user of the smartphone interacted with devices outside of the environment with the home assistant device. The usage information indicates that the user selected a first 5 gigahertz (GHz) wireless network rather than a first 2.4 GHz wireless network for the smartphone to communicatively couple with at a first location outside of the environment, and that the user selected a second 2.4 GHz wireless network rather than a second 5 GHz wireless network for the smartphone to communicatively couple with at a second location outside of the environment, the first location and the second location being different. The processor can determine that the usage information also represents first characteristics of the smartphone within the first location when the first 5 GHz wireless network was selected, and second characteristics of the smartphone within the second location when the second 2.4 GHz wireless network was selected. The characteristics can include one or more of a battery life remaining of the smartphone or a signal strength of the corresponding wireless network from a perspective of the smartphone. The processor can determine that the environment of the home assistant device includes a router configured to provide a third 2.4 GHz wireless network but not a third 5 GHz wireless network and determine that the user prefers 5 GHz wireless networks over 2.4 GHz wireless networks based on the selection of the first 5 GHz wireless network within the first location, and based on the first characteristics of the smartphone corresponding the first location and the second characteristics of the smartphone corresponding to the second location. The processor can update configuration settings of the router to implement the third 5 GHz wireless network within the environment of the home assistant device based on the determination of the preference of the user and update configuration settings of the smartphone to prioritize selection of the third 5 GHz wireless network over the third 2.4 GHz wireless network provided by the router within the environment of the home assistant device.

DETAILED DESCRIPTION

Figure 1:
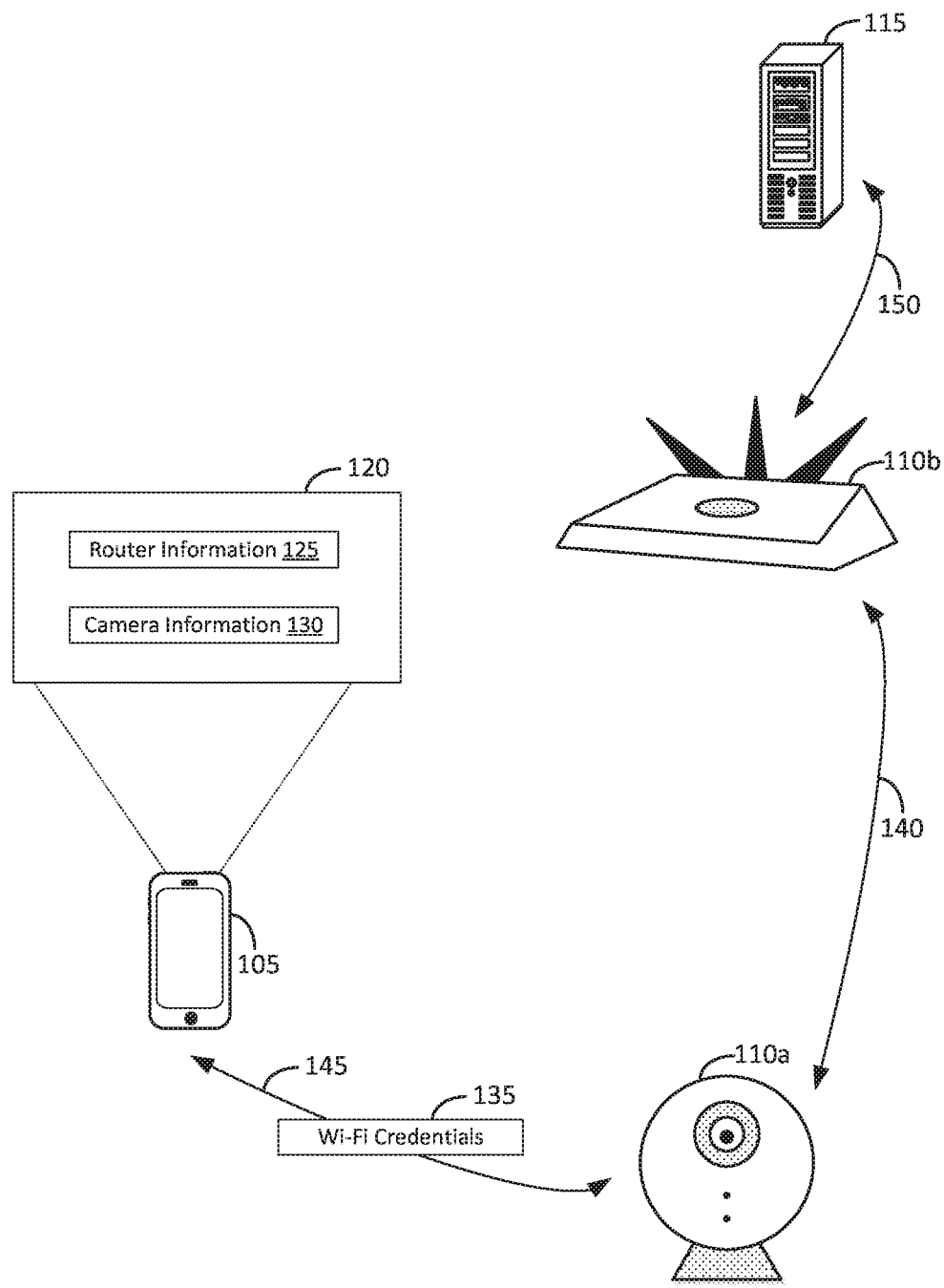
FIG. 1 illustrates an example of an assistant device for managing network devices.

This disclosure describes devices and techniques for setting up and managing devices on a wireless network. In one example, an assistant device (e.g., implemented by a smartphone) can store information regarding the devices set up on a home's wireless network. That stored information can include configuration settings for some of those devices, such as the credentials for the home's wireless network (e.g., the name or service set identifier (SSID) of the wireless network, password to connect with the wireless network providing access to the Internet, etc.) as provided by a router and/or access point. If a new device needs to be set up on the home's wireless network, the assistant device can determine the configuration settings that it needs and provide those configuration settings to the new device so that it can connect to the home's wireless network. For example, the assistant device can communicate with the new device using a communications channel (e.g., using a wireless standard implementing a personal area network (PAN) such as Bluetooth®) and provide the wireless network credentials. Because the new device is provided the wireless network credentials, it can then connect with the wireless network using another communications channel (e.g., using one of the Institute of Electrical and Electronics Engineers (IEEE) 802.11 standards implementing a wireless local area network (WLAN)). As a result, the new device can be installed onto the home's wireless network without much involvement of its owner or user.

In another example, devices sometimes lose their configuration settings and need to be reconfigured to connect with the home's wireless network. The assistant device can determine if devices are off the wireless network, and if so, provide the proper configuration information so that the devices can easily reconnect to the wireless network. This can also result in little involvement of the owner, and therefore, devices can be configured to reconnect with the home's wireless network so that that the owner's home experience appears to be without interruption.

This disclosure also describes devices and techniques for setting up and managing devices on a wireless network in a home based on the configuration settings and usage of other devices outside of the home. For example, the owner or user of a smartphone might carry a smartphone around into several locations, for example, the user's home, the user's brother's house, the user's workplace, and a coffee shop. Several of these locations might have different home assistant devices that provide an artificial intelligence (AI) capability with speakers to provide voice output, microphones to receive voice input, and/or touchscreen displays for providing visual output and receiving touch input. As the owner interacts with the home assistant devices outside of the home, the smartphone can store information regarding those interactions. When the owner returns to the home, that information can be provided to the home assistant device so that it can update its own configuration settings to reflect how the owner interacted with the other home assistant devices. Thus, the owner's home assistant device can be more finely-tuned to how the owner interacts with all home assistant devices. This can allow for the home assistant device in the owner's home to quickly adapt to the owner's preferences.

Additionally, information regarding how the owner interacts with other devices within those locations can be stored on the smartphone and provided to the home assistant device. The home assistant device can then update or change the configuration settings of devices within the home based on how the owner interacted with devices elsewhere. For example, if the owner is in the coffee shop and has an option to connect a smartphone to a 2.4 gigahertz (GHz) or a 5 GHz wireless network, and the owner selects the 5 GHz network, then this information can be determined and stored by the smartphone. When returning home, the information can be provided to the home assistant device. The home assistant device can then analyze the setup of the router within the owner's home and if that router is not providing a 5 GHz wireless network, the home assistant device can update the configuration settings of the router such that the wireless network is provided. The home assistant device can also update the configuration settings of the smartphone such that it would select the 5 GHz wireless network over the 2.4 GHz wireless network. As a result, the devices within the owner's home can have their configuration settings adjusted based on how the owner interacts with devices elsewhere. This can allow for new capabilities or resources within the home to be implemented, or existing capabilities can be adapted to the owner's preferences.

In more detail, FIG. 1 illustrates an example of an assistant device for managing network devices. In FIG. 1, assistant device 105 stores configuration information 120 including data regarding devices such as router 110b. The configuration information can include data such as the configuration settings that other devices need to be able to access the resources of the corresponding devices in the home. For example, router 110b can provide a wireless network providing a WLAN under the IEEE 802.11 standards. Devices connecting to that wireless network can then access other devices within the wireless network as well as provide information to router 110b to be transmitted 150 to an Internet server 115 (i.e., to a device of another network). In some implementations, when assistant device 105 initially connects with the wireless network provided by router 110b, it can store the wireless network credentials as router information 125. That is, the configuration settings (such as the SSID and password) that other devices would need to be able to access the wireless network provided by router 110b can be stored by the assistant device as router information 125.

In FIG. 1, camera 110a can be a new device to set up on the wireless network and, therefore, it needs the credentials of the wireless network. In some scenarios, the owner or user of camera 110a may set up camera 110a manually, for example, by using software associated with camera 110a to select the proper wireless network and manually type in its password so that it can properly connect to the home's wireless network. Unfortunately, this can be a complicated and time-intensive process. However, with assistant device 105, router information 125 can be provided to camera 110a so that it can easily connect to the wireless network without much intervention from the user.

For example, camera 110a and assistant device 105 can communicate with each other over a wireless communication channel using a personal area network (PAN) standard (or protocol) such as Bluetooth®, ZigBee®, Z-Wave®, INSTEON®, IrDA®, Wireless USB®, etc. In contrast with a WLAN, a PAN can be a relatively shorter-distance or shorter-range wireless network. In some implementations, camera 110a set up the PAN and can broadcast a message to assistant device 105 that it needs the credentials to the WLAN wireless network using the PAN. As a result, when assistant device 105 comes into a close enough proximity with camera 110a and is able to connect to the PAN upon being within range, it may detect a signal using the PAN wireless communication standard indicating that camera 110a needs the WLAN credentials to set up on the home's wireless network. In some implementations, assistant device 105 may initiate the initial communications with camera 110a.

Upon determining that camera 110a needs configuration settings for the WLAN, assistant device 105 can determine the specific configuration settings that camera 110a needs, look up that information in configuration information 120, and provide the corresponding configuration settings to camera 110a. For example, camera 110a may provide a request for configuration settings indicating that it needs the SSID and password of the home's wireless network (i.e., the wireless network implemented using the WLAN). Assistant device 105 can receive the request data (e.g., over the wireless communication channel corresponding to the PAN) and provide the requested configuration settings (also using the PAN). For example, in FIG. 1, camera 110a has requested the wireless credentials of the home's wireless network. That is, camera 110a can request the wireless credentials that assistant device 105 itself uses for access to the home's wireless network provided by router 110b. As a result, wireless network credentials 135 indicating the SSID and password of the wireless network provided by router 110b can be provided by assistant device 105 to camera 110a because it stores such information within configuration information 120. Camera 110a can then store wireless network credentials 135 in its own memory and update its configuration settings such that it can access the home's wireless network as provided by router 110b. Thus, camera 110a can receive configuration settings for the WLAN via the PAN and then access the WLAN based on the configuration settings.

In some implementations, because camera 110a has been set up, or installed, onto the home's wireless network, configuration settings for camera 110a can also be stored in configuration information 120 of assistant device 105. For example, camera information 130 can be generated indicating that camera 110a needs configuration settings regarding router 110b (e.g., wireless network credentials 135 stored as router information 125). Additionally, camera 110a might provide configuration settings for other devices to be able to use camera 110a. For example, assistant device 105 might store a username, password, network address, camera 110a type, camera 110a capabilities, or other types of information regarding camera 110a so that other devices can be set up to communicate with and use the resources of camera 110a if provided the corresponding configuration information. This configuration settings can be provided before or after camera 110a is provide the configuration settings to access the wireless network.

As a result, assistant device 105 can set up devices on a home's wireless network. Moreover, assistant device 105 can store information regarding the devices it sets up devices onto the home's wireless network such that other devices can be automatically set up to use other devices by being provided the configuration settings needed.

Sometimes, a device that was previously set up on a home's wireless network can lose its configuration settings, and therefore, need to be provided with configuration settings to reconnect with the wireless network. This can happen if a device loses power, physically resets, etc. In some implementations, the assistant device can manage the devices of a home by determining if devices are off the home's wireless network, and if so, provide the configuration information needed so that the devices can be operational to their prior state, for example, being able to reconnect with the wireless network.

Figure 2:
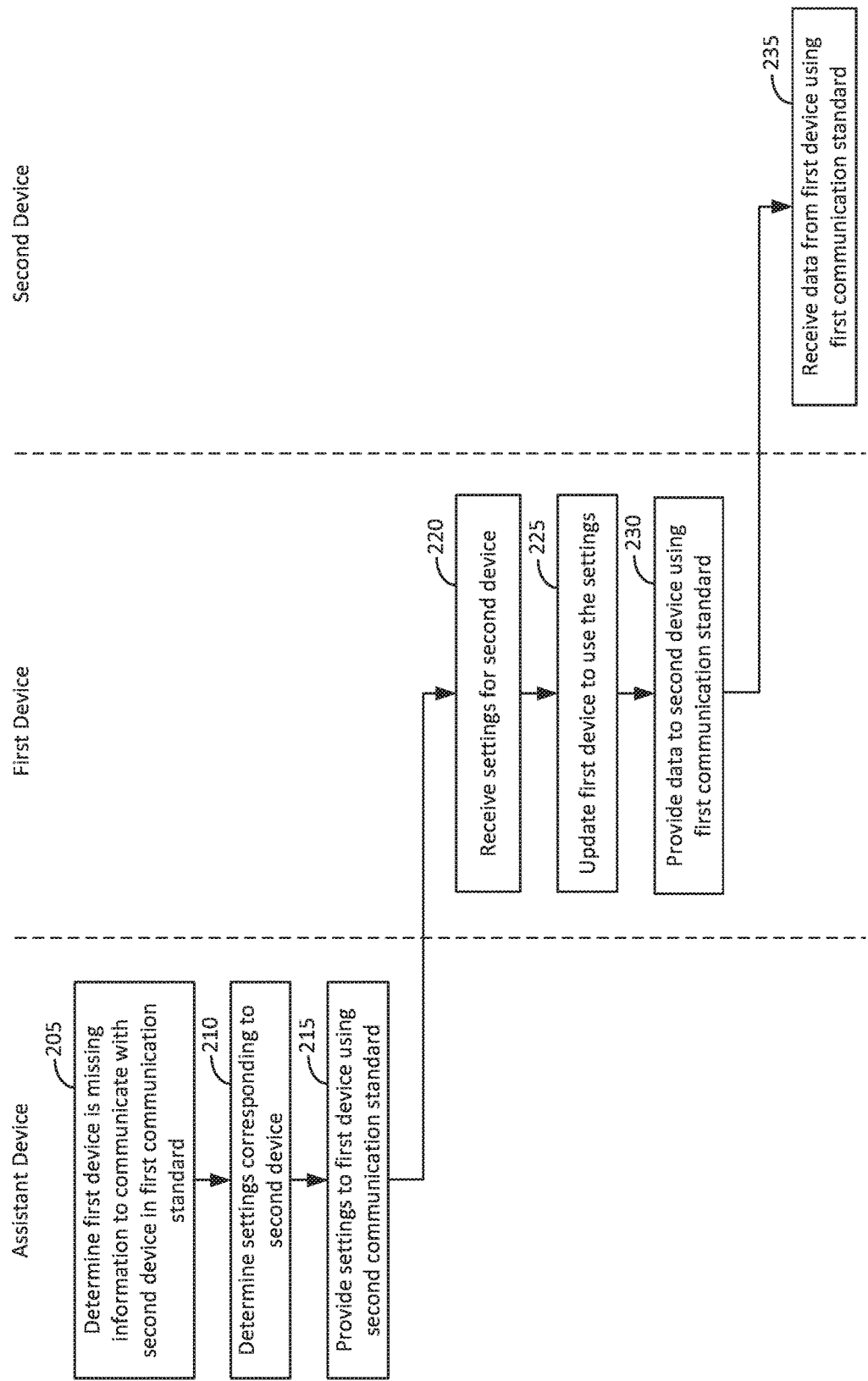
FIG. 2 illustrates an example of a block diagram for managing network devices.

FIG. 2 illustrates an example of a block diagram for managing network devices. In FIG. 2, at block 205, an assistant device can determine that a first home device is missing configuration settings. For example, because camera 110a in FIG. 1 was previously set up on the wireless network, assistant device 105 can communicate via the WLAN to check if camera 110a is properly configured. That is, assistant device 105 can attempt to communicate with camera 110a via a wireless communication standard corresponding to the home's wireless network. If assistant device 105 cannot communicate with camera 110a using that standard, then it can determine that it is not properly configured. In some implementations, assistant device 105 can attempt to communicate with camera 110a because it stores its network address or other type of contact information in camera information 130. In some implementations, assistant device 105 and camera 110a can communicate over the PAN communication channel to determine that camera 110a is missing the configuration settings. Camera 110a can alert assistant device 105 that it is missing the configuration settings, or assistant device 105 can contact camera 110a to request an update as to the status of its configuration settings.

At block 210, assistant device 210 can determine the configuration settings for the other device that camera 110a needs, for example, the configuration settings for router 110b. For example, because camera 110a was set up by assistant device 105 before, it can provide, in block 215, the same configuration settings, for example, wireless credentials 135 stored in configuration information 120 as router information 125. These configuration settings can be provided using the other communication standard, for example, the PAN communication standard that was initially used when camera 110a was provided the configuration settings for router 110b. This can be done because camera 110a can be unable to connect to the WLAN because it is missing the configuration settings that allow it to connect to the home's wireless network.

At block 220, camera 110a can receive the configuration settings. At block 225, camera 110a can update its configuration settings with the received configuration settings of router 110b. As a result, camera 110a can access the home's wireless network via the WLAN communication standard and provide data to router 110b in block 230. At block 235, router 110b can receive data from camera 110a, and therefore, camera 110a has been set back up to be operational within the home wireless network. Accordingly, assistant device 105 can set back up camera 110c using a secondary communication channel (e.g., using the PAN) so that it can access a primary communication channel (e.g., the WLAN provided by the home's wireless network or router 110b).

As previously discussed, assistant device 105 can be a smartphone. However, assistant device 105 can also be a tablet, smartwatch, or other mobile device. In some implementations, assistant device 105 can be a home device acting as a home automation hub, for example, also including speakers, microphones, display, etc. and including an artificial intelligence enabled home assistant.

Figure 3:
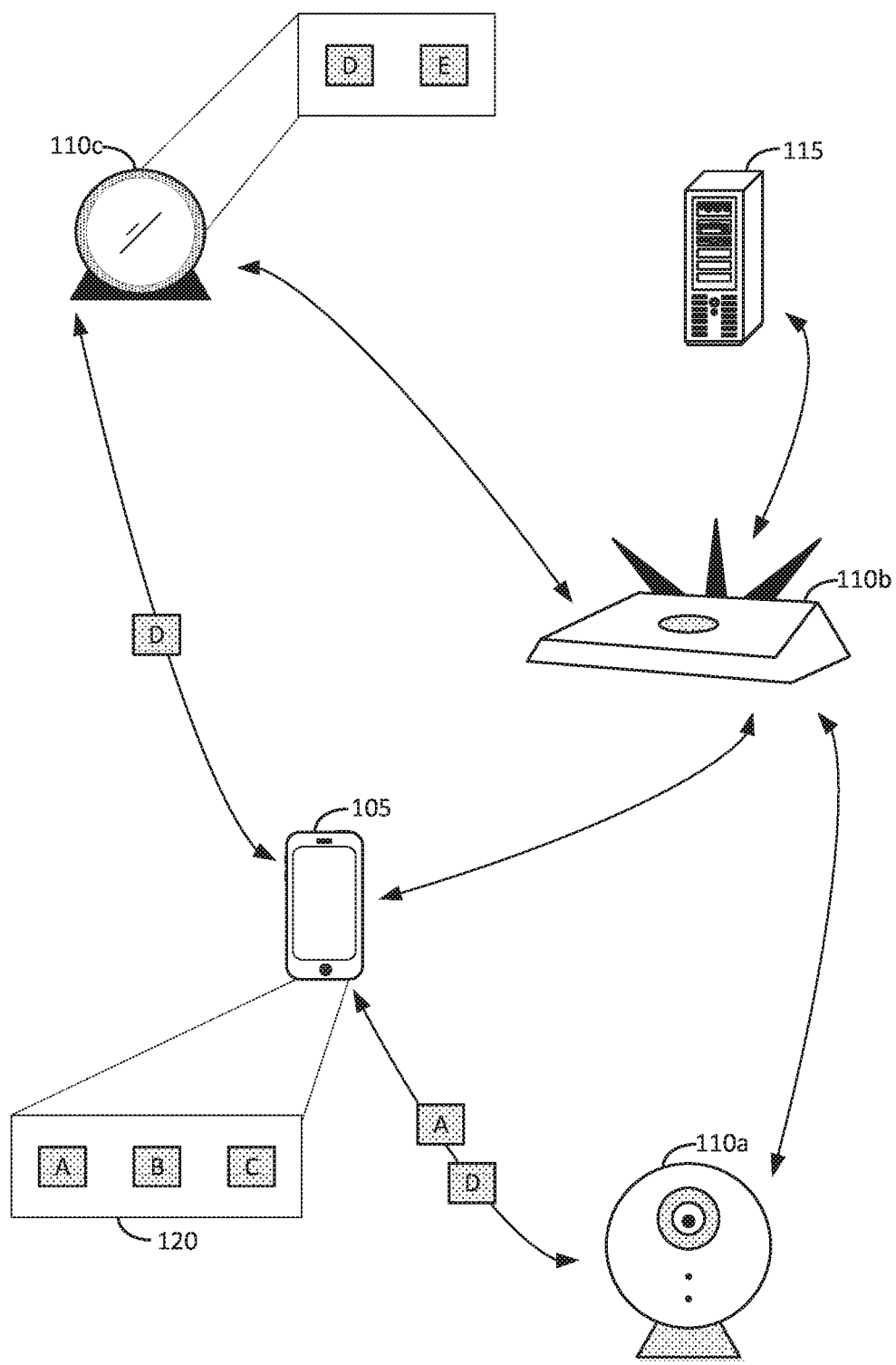
FIG. 3 illustrates an example of an assistant device providing configuration information to a network device using configuration information from another network device.

Some users might be uncomfortable storing configuration settings on a mobile device that can be taken outside of the home and lost. As a result, some configuration settings can be stored by assistant device 105, but some other configuration settings can be stored by another device on the home wireless network. FIG. 3 illustrates an example of an assistant device providing configuration information to a network device using configuration information from another network device.

In FIG. 3, home device 110c can be a home device as discussed above that can be expected to remain in the home, and therefore, can store some sensitive configuration settings that a user might not want stored on assistant device 105 that might be lost outside of the home environment. For example, configuration setting A of configuration information 120 stored on assistant device 105 can include the SSID of the home's wireless network. However, the user might not want the password to the wireless network to be available for other devices to receive from assistant device 105 unless it is within the home. As a result, home device 110c can store configuration setting D that can be the password to the wireless network. As such, when camera 110a is to be provided the wireless network credentials, assistant device 105 can request configuration setting D from home device 110a and then provide configuration settings A and D (i.e., the SSID and password, respectively) to camera 110a. Camera 110a can then connect to the home's wireless network.

Figure 4:
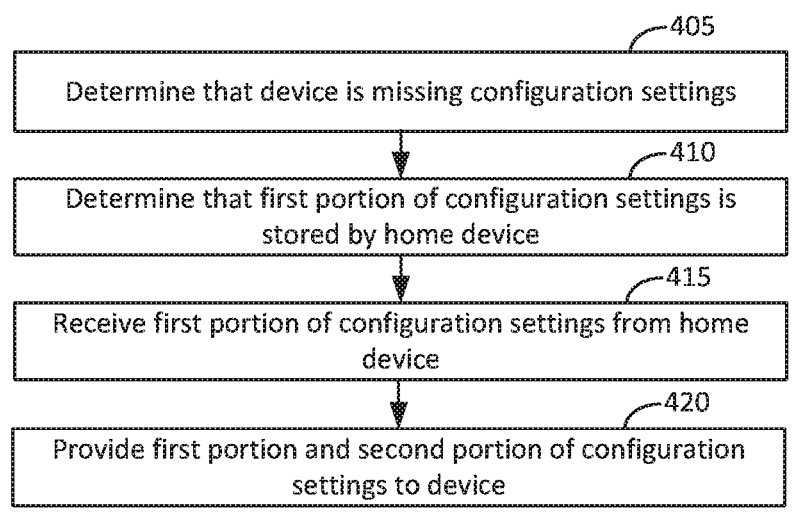
FIG. 4 illustrates an example of a block diagram for providing configuration information to a network device using configuration information from another network device

FIG. 4 illustrates an example of a block diagram for providing configuration information to a network device using configuration information from another network device. In FIG. 4, at block 405, an assistant device can determine that a device is missing configuration settings. For example, as depicted in FIG. 3, assistant device 105 can determine that camera 110a is not able to be contacted via the wireless network provided by router 110b (e.g., the WLAN) and, therefore, it is missing the configuration settings such as SSID or password to connect with the wireless network. In another example, assistant device 105 can communicate with camera 110a using a PAN to determine that camera 110a is not able to connect with the WLAN.

At block 410, the assistant device can determine that a first portion of the configuration settings is stored by a home device. For example, as depicted in FIG. 3, assistant device 105 can determine that camera 110a needs configuration settings A and D which can represent the credentials to use the WLAN. However, configuration settings 120 only includes configuration settings A, B, and C. Configuration settings D and E are stored by home device 110c. As a result, some of the configuration settings needed by camera 110a are stored by assistant device 105, but some of the other configuration settings needed by camera 110a are stored by home device 110c. As a result, assistant device 105 can request configuration setting D from home device 110c and, at block 415, receive that portion of the configuration settings. At block 420, the first portion and the second portion of the configuration settings can be provided to the device. For example, in FIG. 3, configuration settings A and D (i.e., the configuration setting received from home device 110c) can be provided to camera 110a so that it can access the WLAN. In some implementations, the configuration settings can be provided using the PAN, as previously discussed.

In some implementations, assistant device 105 can request to receive configuration setting D from home device 110c when it is communicatively coupled with it via the WLAN provided by the home's wireless network. For example, when assistant device 105 is brought into the home, it can request and receive configuration setting D and, therefore, store it so that it can be provided to other devices within the home. When assistant device 105 then determines that camera 110a needs configuration settings A and D, it can provide both configuration settings. When assistant device 105 leaves the home, it can then delete configuration setting D from its storage. For example, upon determining that it no longer detects the home's wireless network or that it can no longer communicate with home device 110c, assistant device 105 can delete configuration setting D. As a result, assistant device 105 can be able to provide configuration setting D as the user walks around the home, but when the user exits the home with assistant device 105, it can be removed to ensure the security and privacy expectations of the user.

Figure 5:
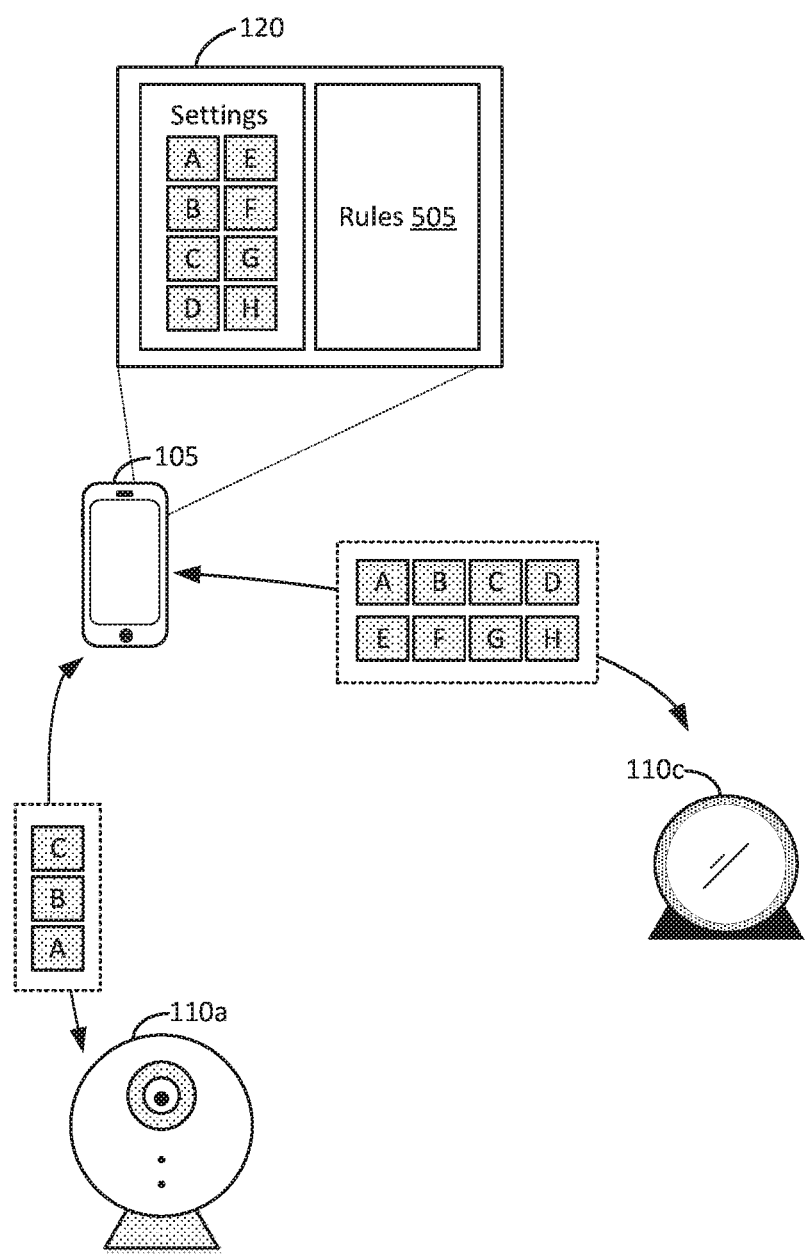
FIG. 5 illustrates an example of an assistant device using rules to configure network devices.

Some users might want to set up devices differently. FIG. 5 illustrates an example of an assistant device using rules to configure network devices. In FIG. 5, assistant device 105 includes configuration information 120 including both configuration settings and rules 505. The rules 505 can represent which configuration settings should be provided to certain devices based on characteristics of the devices. For example, the rules 505 can indicate that certain devices are more trusted than other devices, and therefore, the more trusted devices can be provided with more configuration settings than less trusted devices. In FIG. 5, this is represented by home device 110c being provided configuration settings A-H. By contrast, camera 110a can be provided fewer configuration settings A-C. This might occur because the rules indicate that a home-based device should be provided more configuration settings because it should be interfacing with several devices on the home wireless network so that it can function as a home automation hub. By contrast, camera 110a might be expected to connect with fewer devices, for example, merely just router 110b so that it can access the home's wireless network. Thus, the types of functionality that a device is expected to have or use can be used to determine a level of trust. In some implementations, a device can be provided a level of trust based on the type of device. For example, as discussed above, a home automation hub can be a type of device that might be considered to be more trustworthy than a camera. In some implementations, the trust can be based on the manufacturer of the device, when the device as manufactured, etc. The manufacturer of a device can be determined by receiving information from the devices indicating their manufacturer, receiving a unique identifier (e.g., media access control (MAC) address as representing a unique identification for a network interface card (NIC) of the device) and providing the unique identifier to a server to receive information regarding the manufacturer, etc. Thus, in one example, a device from one manufacturer might be provided more configuration settings than another device from another manufacturer.

In some implementations, the rules 505 can indicate that only a certain number of devices should be provided the configuration settings to another device. This might be done to ensure that a device is not bogged down with too many devices trying to access it. As a result, the configuration settings to that device might be restricted to a threshold number of devices. In some implementations, when the threshold number of devices is reached, a new device might not be provided the configuration settings. In another implementation, if it is determined that the new device has a higher priority to the configuration settings than another device currently using the configuration settings, then the assistant device can remove the configuration settings from the old device and provide the configuration settings to the new device. This allows for the threshold number of devices using the configuration settings to be maintained, but the devices within that threshold number of devices can be different over time.

In some implementations, sometimes many devices may need to be set up. In such scenarios, the rules can indicate a priority order for devices to be provided configuration settings. A device with a higher priority can be provided with its configuration information before a device with a lower priority. Thus, the devices can be connected to the home's wireless network in an orderly manner so as to not overwhelm the router with many overlapping or immediate requests to connect.

In some implementations, if a device is still missing configuration settings (i.e., either assistant device 105 does not have those configuration settings or the rules do not allow it to provide those configuration settings), then assistant device 105 can alert the user that the device is missing some configuration settings. For example, an alert can be provided on the display screen of assistant device 105. The user of assistant device 105 can then manually input the configuration settings and assistant device 105 can provide the configuration settings to the device needing to be set up.

In another example regarding characteristics of devices, rules 505 can indicate that devices within certain locations of the physical environment of the home's wireless network should be provided or excluded certain configuration settings. For example, assistant device 105 can determine that a device is within a bathroom (e.g., based on previously-recorded data input in by the user that the device is in the bathroom, using a camera internal or external to assistant device 105 to take a picture to provide an image frame providing an indication as to the location, etc.). Rules 505 might indicate that devices in the bathroom should not be provided Internet access, and, therefore, configuration settings to a router can be excluded from being provided to the device in the bathroom. However, configuration settings to a network attached storage (NAS) storing music can be provided. Thus, a subset of the configuration settings can be provided to a device based on its determined location within the physical space occupied by the home's wireless network. If a device within the bathroom is moved into the living room, then the device's location can be determined to have changed and the configuration settings previously excluded can now be provided. As a result, rules 505 can indicate that devices with particular characteristics such as location be provided some configuration settings, but devices with other characteristics such as being placed in another location be provided other configuration settings.

In some implementations, assistant device 105 can include a camera or have access to camera 110a. The camera can be used to generate an image frame portraying a device that needs to be set up and assistant device 105 can provide the configuration settings based on the image provided by the camera. For example, assistant device 105 can receive an image frame or a movie including several image frames of a device, determine characteristics of that device based on the image frame or image frames, and then provide configuration settings for that device based on its characteristics. For example, if assistant device 105 receives an image of a wireless speaker, it can determine that the object that should be configured is a wireless speaker (e.g., using image recognition) and that it needs the credentials to access the WLAN provided by a router because the router is the type of resource that a wireless speaker generally needs access to. Assistant device 105 can then provide those credentials via the PAN to the wireless speaker so that it can be set up using the WLAN. In another example, assistant device can provide the image to a server that can analyze the image and provide data back to assistant device 105 indicating characteristics of the device. In another example, assistant device 105 can include such functionality.

Assistant device 105 can also manage devices within the WLAN by withdrawing configuration settings from those devices. For example, some devices can be "knocked off" the network by instructing the devices to delete or remove configuration settings so that they can no longer access the WLAN (or another device). In one example, assistant device 105 can determine the bandwidth of the WLAN being used by a device. If that bandwidth is above a threshold bandwidth (e.g., determined to be too high) then assistant device can communicate with the device (either via the PAN or the WLAN) and instruct it to remove the configuration settings. The device can then delete the configuration settings such that it is no longer able to use the WLAN and, therefore, no longer using an excessive amount of the bandwidth of the WLAN. Thus, the characteristics of the usage of the WLAN can be determined and used to withdraw the configuration settings from a device.

In another example, assistant device 105 can determine whether a device that it has set up is in need of an update (e.g., a firmware update, software update, etc.). Because many updates provide new and important security features in response to cybersecurity threats, assistant device 105 can remove configuration settings of devices that need to be updated. For example, when assistant device 105 sets up a device on the WLAN by providing configuration settings, it can maintain a record of the date when it was set up and update that record to reflect when was the last time the device was updated. If assistant device 105 determines that an update is available (e.g., by querying a database, receiving information from a server, information from a home device, etc.) then it can look at the record and see if the device was updated. If not, assistant device 105 can withdraw the configuration settings for that device in a similar manner as discussed above. In some implementations, assistant device 105 can withdraw the configuration settings if the device has not applied the update (e.g., to update its security features) within a threshold time range (e.g., has not applied the update within one week of assistant device 105 being informed that such an update for the device is available). In some implementations, the priority order of the devices that are set up or provided configuration settings (as previously discussed) can be influenced by whether a device has been updated. Thus, a device that has been updated more recently can have a higher priority than a device that has not been updated recently. As a result, rules 505 can be updated so that the priority can reflect whether devices have been updated. This can allow devices that have been updated more recently to have access to more of other devices within the wireless network of the home, provided more configuration settings, etc.

In another example, assistant device 105 can receive utility information indicating utility usage of devices within the home and then provide or withdraw configuration settings based on the utility usage. For example, the electricity usage can be monitored by a device and assistant device 105 can receive electricity usage data from that device. If the electricity usage data indicates that too much electricity is being used (e.g., the amount of electricity being used exceeds a threshold number), then assistant device 105 can withdraw configuration settings of devices until the electricity usage data indicates that the electricity being used is now at or beneath the threshold number. In another example, assistant device 105 can provide configuration settings as long as the electricity usage is at or beneath the threshold number.

In some implementations, router 110b can provide two WLANs, for example, one at the 2.4 gigahertz (GHz) band and a second at the 5 GHz band. These different WLANs might have use different wireless credentials and, therefore, assistant device 105 can provide those different wireless credentials to devices. For example, one device might be provided the credentials for the 2.4 GHz WLAN and a second device might be provided the credentials for the 5 GHz WLAN. In some implementations, devices that represent a higher security risk (e.g., older devices, devices that have not been updated recently, less trusted devices, etc.) can be provided the credentials to one WLAN but other devices that represent a lower security risk (e.g., newer devices, devices that have been updated recently) can be provided the credentials to the other WLAN. Thus, one WLAN might be used by more secure devices while another WLAN can be used by devices that might have some potential for security problems. This can isolate potential problems to one WLAN while allowing the other WLAN to have a reduced risk to security threats.

In some implementations, multiple assistant devices can be set up in the home. Any missing configuration settings stored by one assistant device can be provided by another assistant device. That is, the different assistant devices might store different subsets of the configuration settings for the devices in the home and these configuration settings can be passed from one assistant device to another assistant device.

Many of the aforementioned examples discuss a wireless network in a home. In other examples, the wireless network may be set up in an office or other place. Many of the aforementioned examples also discuss wireless credentials to access a wireless network. In other examples, other types of configuration settings or credentials can be provided. Additionally, many of the examples discussed above involve certain wireless standards. Other wireless standards such as OpenThread can also be used.

Figure 7:
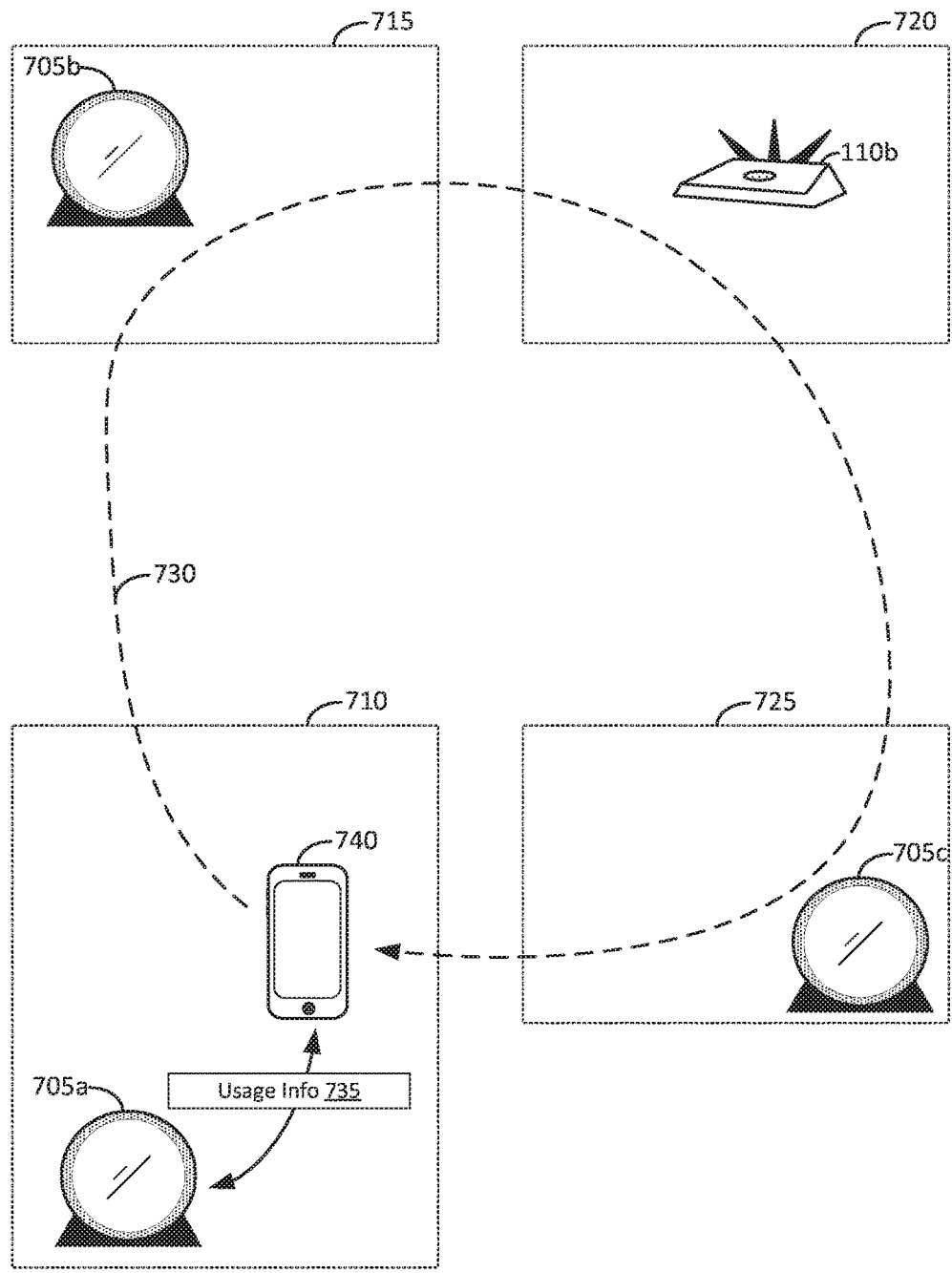
FIG. 7 illustrates an example of setting up and managing devices based on usage of other devices.

Configuration settings of devices can also be set up or changed based on the usage of devices outside of the home. FIG. 7 illustrates an example of setting up and managing devices based on usage of other devices. In FIG. 7, smartphone 705 (e.g., implemented by assistant device 105) can operate within an environment (e.g., a physical space such as a home) with home assistant device 705a (e.g., implemented by home device 110c). Home assistant device 705a can include artificial intelligence (AI) capabilities such that it can provide interaction opportunities to the user within the home. For example, home assistant device 705a can include a speaker for providing audio output (e.g., in the form of speech recognizable to the user), a microphone for receiving audio input (e.g., for determining what the user is speaking), and a touchscreen display for displaying information and receiving selections of content on the touchscreen display via touches.

In one example, the user can provide speech in the form of a question and home assistant device 705a can receive that speech via its microphone, include a processor for analyzing audio data corresponding to the speech, optionally provide the speech to a cloud server for analysis, and then provide an answer in the form of speech via its speaker. Home assistant device 705a can also set up and manage devices similar to the devices described elsewhere herein, for example, assistant device 105, home device 110c, etc. Thus, any of the functionality described with reference to assistant device 105 and/or home device 110c can also be implemented by home assistant device 705a.

In FIG. 7, the user may be in location 710, for example, the user's home which includes home assistant device 705a. Over time, the user might bring smartphone 740 into other locations in which other devices are located. For example, location 715 might be the user's brother's home which also includes another home assistant device 705b. Later, the user might go to location 720 which might be a coffee shop. The coffee shop might provide a free wireless network offering access to the Internet to customers using router 110b. Later, the user might go to location 725, which can be the user's workplace where the user also has an assistant device 705c there. Thus, the user (having smartphone 740) might be interacting with home assistant devices within different locations as well as other devices (e.g., router 110b) throughout the day.

In some implementations, smartphone 740 can store information regarding how the user or smartphone 740 is interacting with these devices (e.g., home assistant devices 705b and 705c, and router 110b) and provide that information to home assistant device 705a. Home assistant device 705a can analyze that information and then set up devices within location 710, for example, by changing configuration settings or providing new configuration settings for devices within location 710 based on the user's interactions with devices in locations 715, 720, and 725. In some implementations, this can enable new resources for the user by implementing new functionalities of the existing devices within the home.

For example, location 710 (i.e., the user's home) can include a router providing access to a resource such as a wireless network. The router might have its configuration settings set such that it provides a 2.4 GHz wireless network (e.g., a 2.4 GHz wireless network as implemented by the IEEE 802.11 standards, as previously discussed). As the user goes on journey 730 to locations 715, 720, and 725, router 110b might be providing wireless networks in a coffee shop. In some implementations, that router 110b might provide a 2.4 GHz wireless network and a 5 GHz wireless network. Smartphone 740 can determine that both networks are available and whether the user selects the 5 GHz wireless network. That is, the user selected the 5 GHz wireless network rather than the 2.4 GHz wireless network within location 720. The user might select one type of network based on a consideration of the advantages and disadvantages between the 2.4 GHz and 5 GHz wireless networks.

When the user returns home, smartphone 740 can detect that it is within the wireless network of its home corresponding to location 710 and that home assistant device 705a is set up. Thus, it can provide usage information 735 to home assistant device 705a indicating that smartphone 740 selected (and therefore also the user) the 5 GHz wireless network rather than the 2.4 GHz wireless network within location 720.

Home assistant device 705a can then determine whether a router within location 710 is providing a 5 GHz wireless network. For example, home assistant device 705a can store or access the configuration settings as previously discussed, scan the available wireless networks to see if there is a 5 GHz wireless network implemented within location 710, or communicatively connect with the router within location 710 to determine its configuration settings and, therefore, whether it is implementing a 5 GHz wireless network. If not, then home assistant device 705a can update the configuration settings of the router such that it can implement a wireless network, as well as update the configuration settings of smartphone 740 such that it can prioritize a connection with the 5 GHz wireless network over the previous 2.4 GHz wireless network provided by the router of location 710. That is, home assistant device 705a can provide new configuration settings to the router such that it provides a new resource (i.e., the 5 GHz wireless network) within location 710 based on the usage of the 5 GHz wireless network by smartphone 740 within location 720.

Home assistant device 705a can then provide new configuration settings to smartphone 740 such that it can use that new resource, and in some cases even prioritize over other resources that were previously used (i.e., use that resource first if multiple resources are available such as both the 2.4 GHz and 5 GHz wireless networks within the home). Thus, the user's preferences can be learned by the user's actions in other environments or locations, and those preferences can be implemented within the user's home. Moreover, new resources can be provided by existing devices via adjusting their configuration settings and, therefore, their functionalities. The user's other devices can then be updated to use those new resources. This results in new resources within the home that can be provided to the user that they otherwise might not have been aware of before.

In some implementations, home assistant device 705a can determine that a device is currently not configured to be able to provide the resource, but it can be reconfigured such that it can provide that resource. For example, home assistant device 805a can determine that the router cannot provide a 5 GHz wireless network unless its firmware is updated because it is currently operating an older version of the firmware. Thus, home assistant device 705a can then instruct the router to update its firmware, or home assistant device 705a can download the firmware and then provide it to the router if that new version of the firmware can allow the router to be able to provide the 5 GHz wireless network. Thus, home assistant device 705a can determine the capabilities of devices within the home, and update the devices such that they can provide new capabilities (e.g., by having the device install a firmware update) if that is available.

In some implementations, the router within location 710 and smartphone 740 can be updated with new configuration settings corresponding to a new resource if the user selects a similar resource a threshold number of times (e.g., five times) within a threshold number of locations (e.g., three locations). For example, if the user takes smartphone 740 to locations 715, 720, and 725 and selects a 5 GHz wireless network over a 2.4 GHz wireless network five times within those three different locations, then this can be an indication that the user prefers the 5 GHz wireless network. Thus, when the user returns to location 710, usage information 735 can provide this information to home assistant device 705a and home assistant device 705a can determine that these thresholds have been met and then update the configuration settings. In some implementations, if the user has selected 5 GHz wireless networks and 2.4 GHz wireless networks, then the network that was selected more (or the most of more than two types of wireless networks were selected among) can be determined to be the user's preference and set up by home assistant device 705a if not implemented by the router within location 710.

In another example, the number of locations in which a resource is selected can be used to determine the user's preferences. For example, if smartphone 740 selects a 5 GHz wireless network within locations 715 and 720, but selects a 2.4 GHz wireless network within location 725, then usage information 735 can be provided to home assistant device 705a and home assistant device 705a can determine that the 5 GHz wireless network was selected within more different locations (or more unique 5 GHz wireless networks were selected) and that can be indicative of the user's preferences to be set up within location 710.

In some implementations, the characteristics of smartphone 740 within those different locations can be determined and used by home assistant device 705a when determining whether to update configuration settings. For example, usage information 735 can indicate the signal strength of the wireless networks (e.g., in decibel-milliwatts), battery level of smartphone 740 (e.g., 40% charge remaining until smartphone 740 is no longer powered), orientation (e.g., whether its display is providing content in landscape or portrait modes), etc. Based on that information, home assistant device 705a might determine whether to update configuration settings of any devices within location 710 (including its own configuration settings).

For example, if smartphone 740 was within location 715 and selected a 2.4 GHz wireless network and was within location 720 and selected a 5 GHz wireless network, this might represent a conflict in terms of the preferences of the user. In some implementations, the characteristics of smartphone 740 when those selections were made can be analyzed and used to determine which better represents the user's preferences. For example, if the signal strength of the selected wireless network within location 715 was weaker than the signal strength of the selected wireless network within location 720, and the 2.4 GHz wireless network was selected within location 715 and the 5 GHz wireless network was selected within location 720, then home assistant device 705a can provide or update configuration settings for the router of location 710 to implement a 5 GHz wireless network and update the configuration settings of smartphone 740 such that it selects that new 5 GHz wireless network within the home. As a result, conflicts between the usage of other devices outside of location 710 can be resolved by home assistant device 705a using characteristics of smartphone 740 at the time of the usage.

In another example, if a 2.4 GHz wireless network was selected rather than a 5 GHz wireless network within the same location, and the 2.4 GHz wireless network has a stronger signal strength, then this can be determined to be selected due to the stronger signal strength rather than a user's preference for a particular type of wireless network. Thus, in some implementations, the user's preferences can be determined by comparing selections of wireless networks of similar signal strength (e.g., both 2.4 GHz and 5 GHz wireless networks had similar signal strengths). Other examples can include updating resources in a similar way based on a better battery life (i.e., higher battery level remaining such that the device can operate for longer), orientation of the display, etc. For example, if the battery life of smartphone 740 is low, then the user might not be paying attention or want to spend much time to look at the available wireless networks and might just select the first one that the user sees.

In another example, because smartphone 740 is a mobile device with a relatively low battery life compared to devices within the user's home at location 710 that are wired to the home's power supply (i.e., not operating on a short battery life), usage information 735 corresponding with low battery life of smartphone 740 might not be considered by home assistant device 705a when updating configuration settings. This might be done because the user might have different motivations (i.e., preserve battery life of smartphone 740) when outside of the home. Thus, if the battery level drops below a threshold percentage or number, then that usage information 735 might not be considered, or it might be weighted to be given lower priority than usage information obtained when smartphone 740 had a higher battery life.

Characteristics of the environment of the locations can also be determined and used in a similar manner. For example, environments that include other home assistant devices can be prioritized in a similar manner than environments without a home assistant device. Thus, in the prior example, the 2.4 GHz wireless network can be determined to be preferred because location 715 includes home assistant device 705b but location 720 does not include one and, therefore, home assistant device 705a might not set up the router within location 710 to provide a new resource such as the 5 GHz wireless network in the example. In some implementations, the type of location can be determined and used to resolve a conflict. For example, usage information from a residential location might be prioritized over a commercial location, or vice versa. Some of this information can be determined, for example, by smartphone 740 recording and storing a global positioning satellite (GPS) coordinate for each of locations 715, 720, and 725. When usage information 735 is provided to home assistant device 705a, it can receive the GPS locations and contact a cloud server to request confirmation whether the locations are residential, commercial, industrial, or other types of locations. Thus, in one example, the usage information of a residential type of location can be prioritized over the usage information of a commercial type of location.

In some implementations, home assistant device 705a can provide new configuration settings to change the behavior or functionality of a device within location 710 without having it provide a new resource. For example, if the user brings smartphone 740 into location 715 and the user changes the thermostat to a particular temperature (e.g., 74 degrees Fahrenheit) and then the user returns to location 710, home assistant device 705a can receive usage information 735 indicating that the user manipulated a thermostat at location 715. Home assistant device 705a can determine that there is a similar device within location 710 (e.g., a thermostat that provides a similar functionality implemented by another device within location 715) and then provide new configuration settings to the thermostat within location 710 such that it is set to a similar or same temperature. In the example, home assistant device 705a can update the configuration settings of the thermostat within location 710 to be at 74 degrees Fahrenheit.

In some implementations, usage information 735 can indicate that the user was within a location such as location 715 and used a type of device that is not within location 710 (i.e., the home with home assistant device 705a) or that a device within location 710 cannot provide that functionality. Thus, the functionality implemented by that device and how the user used that device within location 715 might not be similar to how the user would use a single device within location 710. In some implementations, home assistant device 705a can determine the type of device and/or how the device was used within location 715 and then determine whether multiple devices within location 710 can have their configuration settings updated such that in the aggregate they can provide similar or the same functionality (or resource) of the single device within location 710 that was used by the user. For example, if the user watches a television within location 715 at a relatively high volume, home assistant device 705a might determine that the television within location 710 cannot provide audio playback at the same volume (e.g., its maximum output is at a lower decibel than the television of location 715). Home assistant device 705a can determine this by recording audio of the television using its microphone, can be provided information regarding the audio volume from the television, or it might access that information from a cloud server.

Home assistant device 705a can then determine whether other devices within location 710 can provide similar functionality (e.g., play back audio at a volume that the television within location 715 was played back at). For example, home assistant device can determine that the environment within location 710 includes, in addition to the television, speakers, a receiver, etc. Home assistant device 705a can then update the configuration settings of the television, receiver, speakers, or other home video equipment such that the television volume and the speaker volume can together provide a similar or same volume as the television of location 715. Thus, a single device within location 715 can be emulated with multiple devices within location 710.

As a result, the playback of media content (e.g., television shows, movies, streaming content, etc.) within location 710 can be adjusted by changing the configuration settings of devices with home assistant device 705a upon receiving usage information 735 indicating how the user is playing back media content elsewhere such as location 715.

In another example, the user might play back media content on a streaming service within location 715. This can be determined by smartphone 740 (e.g., it can communicate and receive such information from home assistant device 705b) and then provided to home assistant device 705a. If the user does not have access to that streaming service, then in some implementations home assistant device can determine that, enroll the user in that streaming service (e.g., register the user), and then provide configuration settings to a smart television within location 710 such that it can receive the credentials (e.g., username and password) for the user's enrollment into the service and download the streaming application such that they can watch video content using that streaming service within their own home. Thus, the user's media playback options can be expanded based on the media being watched on various services elsewhere. This can result in the television being able to provide an additional resource.

Additionally, the configuration settings of home assistant device 705a itself can be adjusted. For example, how the user communicates or interacts with home assistant device 705c in location 725 can be used to adjust how home assistant device 705a communicates or interacts with the user within location 710. Examples of configuration settings for home assistant device 705a can be the accent and/or language of the voice that it provides audio output in, the speed of the voice output, etc. Thus, in one example, if the user talks faster to home assistant device 705c than she was previously talking to home assistant device 705c (e.g., before departing on journey 730), then this can be determined using usage information 735 and home assistant device 705a might speed up its audio output such that its speech (as audio output) is faster.

The graphical user interface (GUI) of home assistant device 705a can also change based on the usage of devices outside of the home. For example, if the user requests for home assistant device 705b within location 715 to display the weather for another city, this information can be stored by smartphone 740. When the user returns to location 710, home assistant device 705a can receive usage information 735 indicating that the user requested weather information from another home assistant device and then display similar information (e.g., the weather for that other city) on its display screen.

Figure 8:
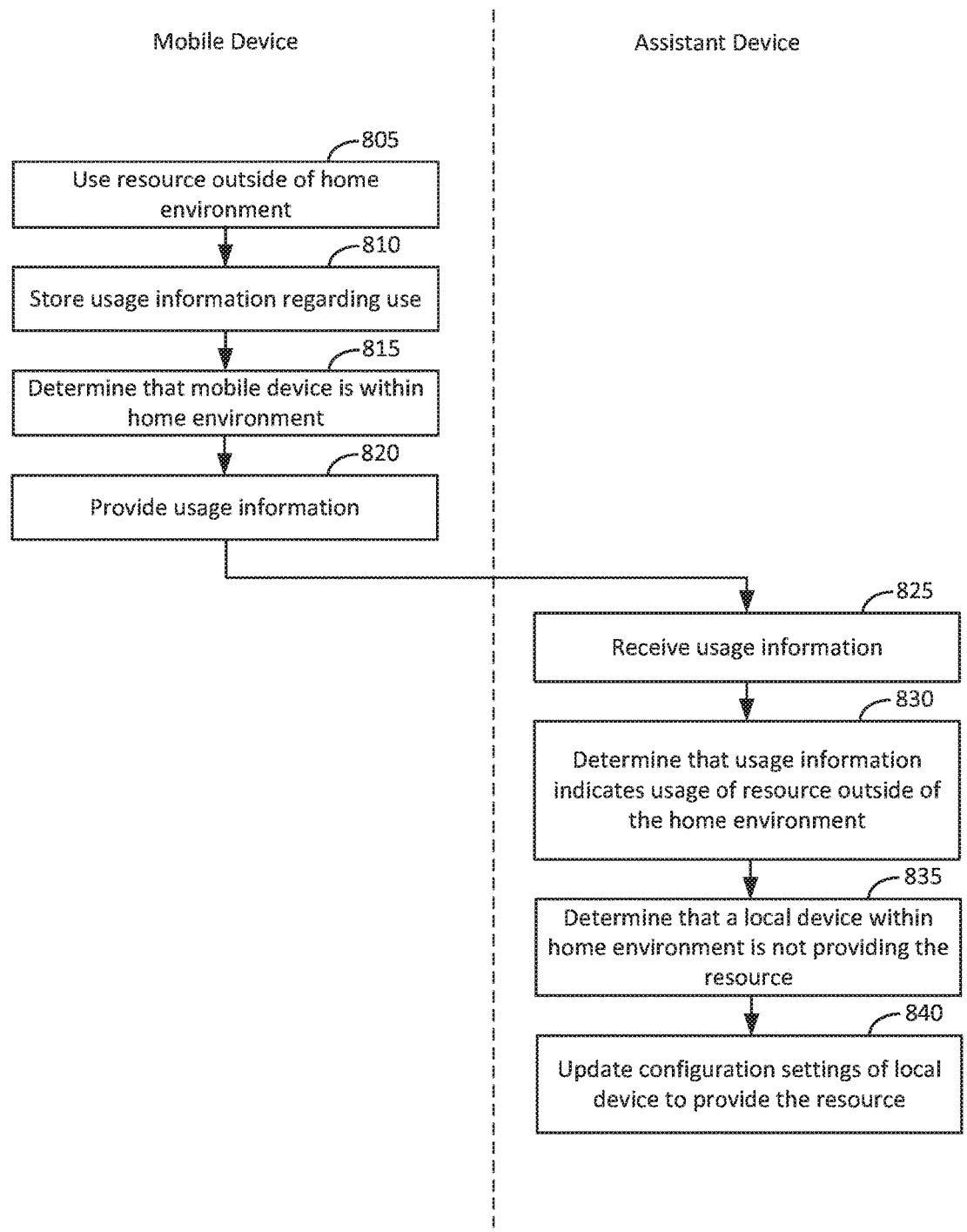
FIG. 8 illustrates an example of a block diagram for setting up and managing devices based on usage of other devices.

FIG. 8 illustrates an example of a block diagram for setting up and managing devices based on usage of other devices. In FIG. 8, a mobile device (e.g., a smartphone, tablet, smart watch, etc.) can use a resource outside of a home environment (805). For example, as discussed regarding FIG. 7, smartphone 740 can be brought into locations 715, 720, and 725 to interact with different devices and/or resources such as wireless networks. Usage information regarding how the mobile device is using the resource can be stored in memory (810) and when the mobile device determines that it has returned to its home environment (815) it can provide the usage information to an assistant device (820). For example, in FIG. 7, smartphone 740 can return to location 710 (i.e., the user's home), detect that it is communicatively coupled with the home's wireless network and provide usage information 735 to home assistant device 705a. Usage information 735 can indicate how the user used devices and/or resources within locations 715, 720, and 725, as well as characteristics of smartphone 740 when in those locations, characteristics of those locations, or other details as disclosed herein.

An assistant device within the home environment can receive the usage information (825) and then determine that the usage information indicates that the user via the mobile device used a resource outside of the home environment (830). For example, in FIG. 7, home assistant device 705a can receive usage information 735 indicating how the user selected wireless networks within the different locations.

The assistant device can then determine that a local device within the home environment is not providing the resource (835) and update the configuration settings of the local device to provide the resource (840). For example, if the local device is a router, home assistant device 705a can update its configuration settings such that it now provides a new wireless network.

In another example, a user can adjust the time of a clock in one of the other locations. When the user returns to location 710, usage information 735 can be provided to home assistant device 705a indicating that the user adjusted the time in another location. The time that the user adjusted the clock, the difference between the new time and the old time when the user adjusted the clock, or other information regarding how the user adjusted that clock can be used b home assistant device 705a to update the time provided by clocks within location 710 such that they would be displaying or provided the same time as the clock in the other location at the same time. That is, if the user updated the clock in location 720 to display 7:10 PM and then returns one hour later to location 710, then the clocks within location 710 can be updated to 8:10 PM which would be the time displayed by the clock in location 720.

In another example, usage information 735 can indicate how the user of smartphone 740 turned on or off lights in another location. For example, if at 11:00 PM the user in location 715 turns off all lights, then this might indicate when the user prefers to go to sleep and, therefore, all of the lights in location 710 (e.g., the user's home) can then be configured to go off by home assistant device 705a at 11:00 PM. In another example, the user might only turn off a fraction of the lights in location 715 and keep the remaining lights on. The percentage, number, location, or other information regarding the usage of the lights can be provided via usage information 735 and home assistant device 705a can emulate the behavior of lights within location 710 to be similar or the same as the lights in location 715 (e.g., turn off a similar fraction of lights, lights in a particular location, etc.).

In another example, the user might operate a laundry machine with some settings, for example, set the washing machine to operate at a delicate cycle. This can also be provided via usage information 735 and then home assistant device 705a can update the configuration settings of a washing machine in location 710 to operate at the same delicate cycle when the user washes clothing.

Any of the techniques described herein can also be used in similar ways. For example, how the user sets up devices in other locations can be used to set up devices in the user's home.

Figure 6:
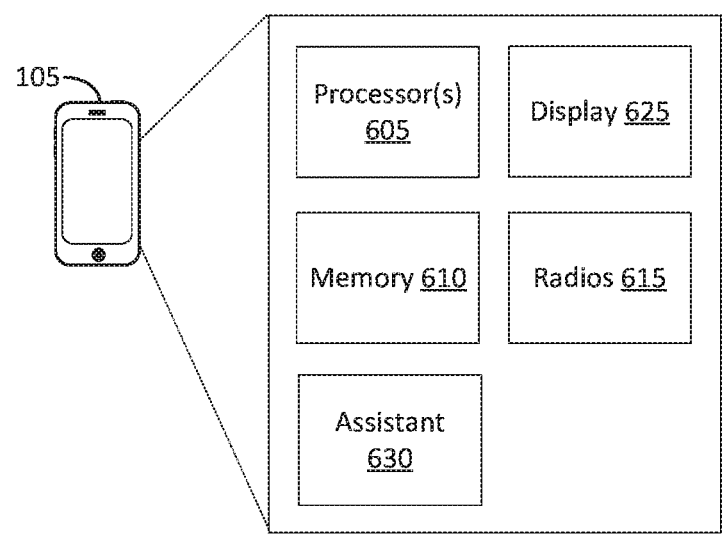
FIG. 6 illustrates an example of a block diagram for using rules to configure network devices.

In FIG. 6, assistant device 105 includes a processor 605, memory 610, touchscreen display 625, radios 615, as well as other types of hardware such as non-volatile memory, an interface device, camera, microphones, speakers, etc. to implement assistant logic 630 providing the techniques disclosed herein. Various common components (e.g., cache memory) are omitted for illustrative simplicity. The assistant device is intended to illustrate a hardware device on which any of the components described in the example of FIGS. 1-8 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for a home assistant device having artificial intelligence (AI) capabilities to update configuration settings of devices within an environment of the home assistant device based on usage of devices outside of the environment, comprising:

receiving, by a processor, usage information from a smartphone that represents how a user of the smartphone interacted with devices outside of the environment with the home assistant device, the usage information indicating that the user selected a first 5 gigahertz (GHz) wireless network rather than a first 2.4 GHz wireless network for the smartphone to communicatively couple with at a first location outside of the environment, and that the user selected a second 2.4 GHz wireless network rather than a second 5 GHz wireless network for the smartphone to communicatively couple with at a second location outside of the environment, the first location and the second location being different;

determining, by the processor, that the usage information also represents first characteristics of the smartphone within the first location when the first 5 GHz wireless network was selected, and second characteristics of the smartphone within the second location when the second 2.4 GHz wireless network was selected, the characteristics including one or more of a battery life remaining of the smartphone or a signal strength of the corresponding wireless network from a perspective of the smartphone;

determining, by the processor, that the environment of the home assistant device includes a router configured to provide a third 2.4 GHz wireless network but not a third 5 GHz wireless network;

determining, by the processor, that the user prefers 5 GHz wireless networks over 2.4 GHz wireless networks based on the selection of the first 5 GHz wireless network within the first location, and based on the first characteristics of the smartphone corresponding the first location and the second characteristics of the smartphone corresponding to the second location;

updating, by the processor, configuration settings of the router to implement the third 5 GHz wireless network within the environment of the home assistant device based on the determination of the preference of the user; and updating, by the processor, configuration settings of the smartphone to prioritize selection of the third 5 GHz wireless network over the third 2.4 GHz wireless network provided by the router within the environment of the home assistant device.

2. A method, comprising:

receiving usage information representing how a user interacted with devices outside of an environment;

determining, by a processor, that the usage information indicates that the user selected a resource provided by a first device at a first location outside of the environment;

determining, by the processor, that a local device within the environment is currently not providing the resource;

updating, by the processor, configuration settings of the local device within the environment to provide the resource that the first device provided at the first location outside of the environment;

updating configuration settings of a mobile device to prioritize selection of the resource provided by the local resource over another resource within the environment; and determining that the usage information also represents characteristics of a mobile device used by the user corresponding to the selection of the resource provided by the first device at the first location outside of the environment, wherein updating the configuration settings of the local device within the environment is based on the characteristics of the mobile device corresponding to the selection of the resource provided by the first device at the first location outside of the environment;

wherein the resource provided by the first device is a wireless network, and the characteristics of the mobile device include one or more of a battery life remaining of the mobile device or a signal strength of the wireless network from a perspective of the mobile device;

wherein the usage information also indicates that the user selected a resource provided by a second device at a second location outside of the environment, the first location being different than the second location, the method further comprising: determining that the user prefers the resource provided by the first device rather than the resource provided by the second device, wherein updating the configuration settings of the local device within the environment to provide the resource that the first device provided at the first location outside of the environment is based on the determination that the user prefers the resource provided by the first device rather than the resource provided by the second device.

3. The method of claim 2, wherein the usage information further indicates characteristics of the first location, wherein updating configuration settings of the local device within the environment to provide the resource that the first device provided at the first location outside of the environment is based on the characteristics of the first location.

4. The method of claim 3, wherein the usage information indicates that the user selected a resource provided by a second device at a second location outside of the environment, wherein the usage information further indicates characteristics of the second location, and updating the configuration settings of the local device within the environment to provide the resource that the first device provided rather than the resource provided by the second device is based on the characteristics of the first location and the second location.

5. The method of claim 2, wherein the local device within the environment is an assistant device configured to respond to the user in audio output including speech, and the resource is a graphical user interface (GUI) provided by the assistant device on a display screen.

6. An electronic device, comprising:

one or more processors; and memory storing instructions, wherein the processor is configured to execute the instructions such that the processor and memory are configured to:

receive usage information representing how a user interacted with devices outside of an environment;

determine that the usage information indicates that the user selected a resource provided by a first device at a first location outside of the environment;

determine that a local device within the environment is currently not providing the resource;

update configuration settings of the local device within the environment to provide the resource that the first device provided at the first location outside of the environment;

update configuration settings of a mobile device to prioritize selection of the resource provided by the local resource over another resource within the environment; and determine that the usage information also represents characteristics of a mobile device used by the user corresponding to the selection of the resource provided by the first device at the first location outside of the environment, wherein updating the configuration settings of the local device within the environment is based on the characteristics of the mobile device corresponding to the selection of the resource provided by the first device at the first location outside of the environment;

wherein the resource provided by the first device is a wireless network, and the characteristics of the mobile device include one or more of a battery life remaining of the mobile device or a signal strength of the wireless network from a perspective of the mobile device;

wherein the usage information also indicates that the user selected a resource provided by a second device at a second location outside of the environment, the first location being different than the second location, wherein the processor is configured to execute the instructions such that the processor and memory are configured to: determine that the user prefers the resource provided by the first device rather than the resource provided by the second device, wherein updating the configuration settings of the local device within the environment to provide the resource that the first device provided at the first location outside of the environment is based on the determination that the user prefers the resource provided by the first device rather than the resource provided by the second device.

7. The electronic device of claim 6, wherein the usage information further indicates characteristics of the first location, wherein updating configuration settings of the local device within the environment to provide the resource that the first device provided at the first location outside of the environment is based on the characteristics of the first location.

8. The electronic device of claim 7, wherein the usage information indicates that the user selected a resource provided by a second device at a second location outside of the environment, wherein the usage information further indicates characteristics of the second location, and updating the configuration settings of the local device within the environment to provide the resource that the first device provided rather than the resource provided by the second device is based on the characteristics of the first location and the second location.

9. The electronic device of claim 6, wherein the local device within the environment is an assistant device configured to respond to the user in audio output including speech, and the resource is a graphical user interface (GUI) provided by the assistant device on a display screen.

10. A computer program product, comprising one or more non-transitory computer-readable media having computer program instructions stored therein, the computer program instructions being configured such that, when executed by one or more computing devices, the computer program instructions cause the one or more computing devices to:

receive usage information representing how a user interacted with devices outside of an environment;

determine that the usage information indicates that the user selected a resource provided by a first device at a first location outside of the environment;

determine that a local device within the environment is currently not providing the resource;

update configuration settings of the local device within the environment to provide the resource that the first device provided at the first location outside of the environment;

update configuration settings of a mobile device to prioritize selection of the resource provided by the local resource over another resource within the environment; and determine that the usage information also represents characteristics of a mobile device used by the user corresponding to the selection of the resource provided by the first device at the first location outside of the environment, wherein updating the configuration settings of the local device within the environment is based on the characteristics of the mobile device corresponding to the selection of the resource provided by the first device at the first location outside of the environment;

wherein the resource provided by the first device is a wireless network, and the characteristics of the mobile device include one or more of a battery life remaining of the mobile device or a signal strength of the wireless network from a perspective of the mobile device;

wherein the usage information also indicates that the user selected a resource provided by a second device at a second location outside of the environment, the first location being different than the second location, wherein the computer program instructions cause the one or more computing devices to: determine that the user prefers the resource provided by the first device rather than the resource provided by the second device, wherein updating the configuration settings of the local device within the environment to provide the resource that the first device provided at the first location outside of the environment is based on the determination that the user prefers the resource provided by the first device rather than the resource provided by the second device.

11. The computer program product of claim 10, wherein the usage information further indicates characteristics of the first location, wherein updating configuration settings of the local device within the environment to provide the resource that the first device provided at the first location outside of the environment is based on the characteristics of the first location.

12. The computer program product of claim 11, wherein the usage information indicates that the user selected a resource provided by a second device at a second location outside of the environment, wherein the usage information further indicates characteristics of the second location, and updating the configuration settings of the local device within the environment to provide the resource that the first device provided rather than the resource provided by the second device is based on the characteristics of the first location and the second location.

13. The computer program product of claim 10, wherein the local device within the environment is an assistant device configured to respond to the user in audio output including speech, and the resource is a graphical user interface (GUI) provided by the assistant device on a display screen.

* * * * *